United States Patent [19]
Tasaka et al.

[11] Patent Number: 5,978,608
[45] Date of Patent: Nov. 2, 1999

[54] LENS-FITTED FILM UNIT HAVING A SHUTTER MECHANISM ADAPTED FOR DATA RECORDING

[75] Inventors: Hisashi Tasaka; Nobuyuki Kameyama, both of Kanagawa, Japan

[73] Assignee: Fuji Photo Film Co., Ltd., Kanagawa, Japan

[21] Appl. No.: 08/890,548

[22] Filed: Jul. 9, 1997

[30] Foreign Application Priority Data

| Jul. 9, 1996 | [JP] | Japan | 8-178912 |
| Jul. 9, 1996 | [JP] | Japan | 8-178913 |
| Jul. 9, 1996 | [JP] | Japan | 8-178914 |
| Jul. 26, 1996 | [JP] | Japan | 8-197808 |
| Aug. 1, 1996 | [JP] | Japan | 8-203928 |
| May 30, 1997 | [JP] | Japan | 9-141249 |

[51] Int. Cl.⁶ .............................. G03B 9/10; G03B 17/24
[52] U.S. Cl. .......................................... 396/315; 396/471
[58] Field of Search .................................. 396/310, 315, 396/316, 317, 439, 452, 471, 493, 494, 497, 502

[56] References Cited

U.S. PATENT DOCUMENTS

| 4,001,850 | 1/1977 | Fujita | 396/316 |
| 4,165,932 | 8/1979 | Asano et al. | 396/317 |
| 5,339,125 | 8/1994 | Fridman et al. | 396/317 |
| 5,721,993 | 2/1998 | Ito et al. | 396/315 |

*Primary Examiner*—Safet Metjahic
*Assistant Examiner*—J. K. Han
*Attorney, Agent, or Firm*—Young & Thompson

[57] ABSTRACT

A lens-fitted film unit has a date recording module which is disposed between an exposure unit and a front cover to project a calendar date onto the front emulsion layer of a film. The front cover is formed with an elevated platform which spatially encircle at least a taking lens, a lighting window and the date recording module as viewed from the front side of the film unit. The date recording module has a module base plate, a transmission type of liquid crystal display is mounted on the module base plate so as to position behind the lighting window formed in the front cover, and a battery attached to the back of the module base plate so as to position within a shadow of the module base plate. A single shutter blade is adapted to control light passage for both image formation and data recordation. Alternatively, two shutter blades are used which interact in a controlled manner.

9 Claims, 14 Drawing Sheets

LENS-FITTED FILM UNIT HAVING A SHUTTER MECHANISM ADAPTED FOR DATA RECORDING

BACKGROUND OF THE INVENTION

1. Field of the Invention

This invention relates to a lens-fited film unit with a data recording device incorporated therein in which the utilization is made of external light to form a data image on a film.

2. Description of Related Art

Easy-use lens-fitted film units are well known. Such a lens-fitted film unit has a film unit housing comprising a main housing section with a film cartridge loaded therein and front and back cover sections attached to the main housing section. The main housing section is provided with various mechanisms or units, such as a shutter mechanism, a taking lens, an exposure unit and a flash unit. When a film is fully exposed, the lens-fitted film unit is forwarded to a photo-laboratory where the film cartridge with the exposed film rewound therein is taken out of the film unit housing and processed for development and printing. The developed film and prints are returned as one set to the customer.

Some types of the lens-fitted film units are provided with a data recording device for recording a calendar date on the film. Such a lens-fitted film unit is known from, for instance, Japanese Unexamined Patent Publication No. 5-289164. According to the Japanese publication mentioned above, the data recording device built in the lens-fitted film unit has a manual data setting dial by means of which a calendar date is set and a data recording optical system comprising an optical light guide through which external light is introduced to illuminate a data display plate and bear an image of the data to the back of the film. In this data recording device, the utilization is made of external light passing through the taking lens and then traveling to the data display plate disposed behind the film through the optical light guide which extends under an exposure chamber between the taking lens and an exposure aperture frame.

In the lens-fitted film unit with the data recording device described above, because the data display plate and the manual data setting dial are installed to the back cover, the film unit housing unavoidably juts backward and has a large thickness, which are undesirable for handiness of the lens-fitted film unit. In cases where the lens-fitted film unit has a built-in flash unit, the film unit housing is increased in height due to a flash battery which is placed under the exposure chamber together with the optical light guide. Further, in cases where the lens-fitted film unit has a contact exposure type of data recording device, the data display plate is placed slightly apart from the film in order to prevent the film from scratch marks. For this reason, the data is blurred on a print and unclear on, in particular, an enlarged print. The photographer of this type of lens-fitted film unit encounters somewhat troublesome data setting operation.

In order for the lens-fitted film unit to have a thin film unit housing, it is preferable to project a data onto the film from the front. For this purpose, a data exposure aperture is provided near a subject exposure aperture to introduce external light toward the film, which is opened and closed by a data exposure shutter cooperating with a subject exposure shutter for opening and closing the subject exposure aperture. This makes it possible to expose the film to a subject image and a data image simultaneously. However, the lens-fitted film unit of the type of projecting a data onto the film from the front has a need to incorporate a data display member between the exposure unit and the front cover section, encounters a difficulty with a thin film unit housing, While a data may be projected onto the film from the front by means of the data exposure aperture and shutter to form a latent image of the data together with a subject image in response to operation of a shutter release member as described above, if the data exposure shutter is provided integrally with the subject exposure shutter, it is necessary to prevent the data exposure shutter from partly crossing the subject exposure aperture in the course of opening the subject exposure aperture. This is because, if the data exposure shutter partly crossing the subject exposure aperture, the subject image encounters a lack of evenness in exposure. Regarding the lens-fitted film unit described in the Japanese publication mentioned above, exposure of the film to a data image is made by external light introduced through the data exposure aperture opened by the data exposure shutter while the subject exposure shutter opens the subject exposure aperture, it experiences a lack of light. Accordingly, there is a strong demand for making the utilization of a lens to make up the insufficient amount of light. This has a need to adjust the lens in axial position and hold it so as to prevent a positional shift due to vibrations. In addition, in view of automatic assembly of the lens-fitted film unit, easiness and convenience of assembling the lens-fitted film unit must be taken into consideration.

Conventional lens-fitted film units, in particular, having data recording devices have less adaptability for recycling. That is, while the data recording device described above is protected from damages by the front and back covers, and hence it is recycled without repair, nevertheless, the data display plate and the manual data setting dial must be detached from the back cover which is one of recycling parts. During detaching work, these parts possibly encounters damages.

SUMMARY OF THE INVENTION

It is an object of the present invention to provide a lens-fitted film unit which is reduced in thickness and height as low as possible and comprises various parts having high adaptability for recycling.

It is another object of the present invention to provide a lens-fitted film unit with a data recording system which produces an improved clear data image and does not affect to a subject image exposure.

It is still another object of the present invention to provide a lens-fitted film unit with a data recording system having a condenser lens which is easily and precisely positioned.

The above objects of the invention are accomplished by providing a lens-fitted film unit having a light-tight film unit housing with a film cartridge loaded therein and a data recording module for recording a data, such as a calendar date at which exposure is made, incorporated in the light-tight film unit housing. The film unit housing is provided therein with an exposure chamber which has a front wall formed with a subject exposure aperture through which subject light from a subject enters the exposure chamber and a data exposure aperture through which external light passing through a data display means of the data exposure system enters the exposure chamber, a shutter blade having a first blade section for opening and closing the subject exposure aperture and a second blade section for opening and closing the data exposure aperture, and exposure means for causing the shutter blade to open and close the subject exposure aperture and the data exposure aperture so as thereby to expose the film to the subject light and the data light simultaneously. The first and second blade sections are integrally formed, and the second blade section is formed outside an area which is screened by the first blade section when the shutter blade opens and closes the subject exposure aperture and the data exposure aperture.

According to another aspect of the invention, the lens-fitted film unit having a simple exposure mechanism and a data recording module comprising a lighting window formed in the light-tight film unit housing through which external light enters, a transmission type of data display disposed behind the lighting window which is illuminated by the external light entering through the lighting window to display data, and exposure means for exposing a film withdrawn from the film cartridge to the external light transmitting through the data display to form a latent image of the data in the film. The data recording module has a power battery attached to and within a shadow of a back of a base plate of the data recording module, and the film unit housing is formed with a platform elevated from the remainder of a front wall of the film unit housing so as to spatially encircle an area including at least a taking lens, the lighting window and the module as viewed from the front side of the film unit housing.

According to another aspect of the invention, the data recording module comprises a transmission type of liquid crystal display for displaying figures, a clock circuit for exciting the liquid crystal display to display a calendar date, a data exposure aperture, which is formed separately from a subject exposure aperture behind a taking lens, for introducing data light passing through the liquid crystal display into a light-tight exposure chamber formed between the taking lens and an exposure frame aperture in a focal plane where the film is placed, a data exposure shutter member disposed between the liquid crystal display and the data exposure aperture for opening and closing the data exposure aperture in cooperation with a subject exposure shutter member disposed between the taking lens and the subject exposure aperture to open and close the subject exposure aperture, and a data recording optical system disposed outside a path of subject light passing through the subject exposure aperture within the light-tight exposure chamber to direct data light passing through the data exposure aperture toward the film.

According to another aspect of the invention, the lens-fitted film unit comprises a simple exposure mechanism and a data recording module incorporated between the intermediate body section and the front cover section. The data recording module includes a transmission type of data display which Is illuminated by external light introduced through a lighting window formed in the front cover section to provide an image of the data to which a film is exposed, a condenser lens for directing the external light toward the data display which is held by a lens holder and positioned by the lens holder in a predetermined position with respect to the data display when the condenser lens is fitted in a direction from the front cover section toward the data display.

The data module is removably incorporated in the lens-fitted film unit between the light-tight exposure chamber and the front cover section and positioned with respect to the main body section by the exposure unit, the data module having a transmission type of data display for displaying a calendar date when the data display is excited by a clock circuit. The data recording optical system is detachably incorporated in the light-tight exposure chamber for directing external light transmitting through the data display to the unexposed film to expose the unexposed film placed behind the light-tight exposure chamber to the light, so as thereby to form a latent image of the data displayed on the data display.

With the lens-fitted film unit of the invention, there is no lack of light, and an even exposure is realized. The power battery is held the module base plate at the back and within a shadow area of the module base plate, the data module is shaped small in size as viewed from the front. Because the film unit housing is formed with a platform elevated from the remainder of the front wall so as to spatially encircle an area including at least a taking lens, the lighting window and the data module, the lens-fitted film unit is made as thin as conventional. The data recording system is installed within the light-tight exposure chamber to direct external light to the film from the front, the film unit housing without a built-in data recording system has no need to be changed in size even when the data recording system is incorporated. The data module automatically changes a calendar date, so as to eliminate date setting, which is convenient. The utilization of an data recording optical system provides a clear data image. Further, the condenser lens is incorporated with the result of being automatically positioned, the lens-fitted film unit has high adaptability to automatic assembly, so as to be manufactured at low costs. Furthermore, the lens is prevented from a positional shift due to vibrations.

BRIEF DESCRIPTION OF THE DRAWINGS

Above and other objects and features of the invention will be understood from the following description relating to specific embodiments thereof when reading in conjunction with the accompanying drawings, in which.

DETAILED DESCRIPTION OF THE SPECIFIC EMBODIMENT

Figure 1:
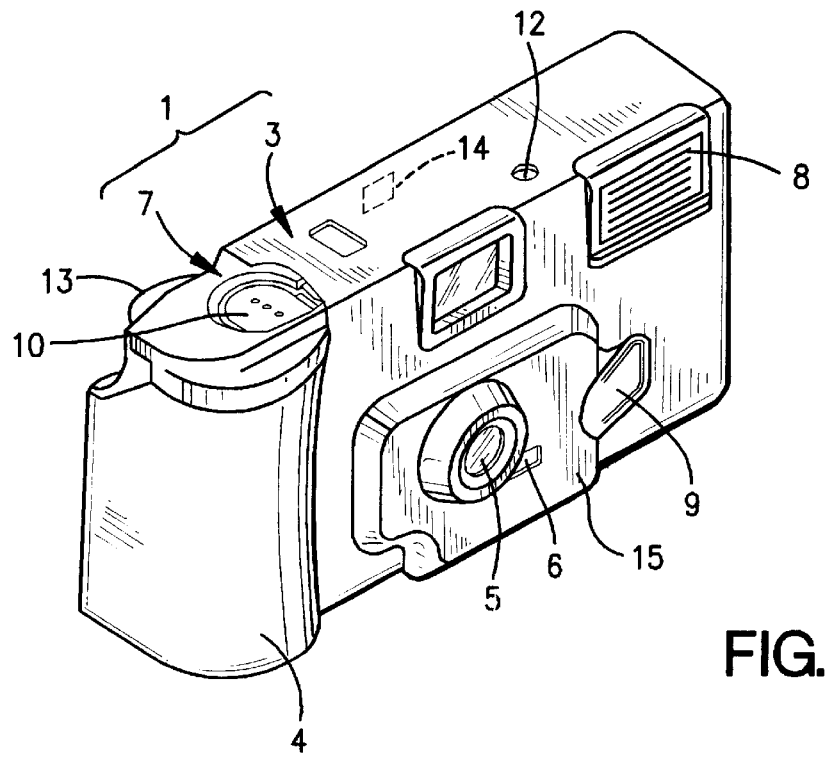
FIG. 1 is a schematic view showing an appearance of a lens-fitted film unit according to an embodiment of the invention.

Referring to the drawings in detail, in particular, to FIG. 1 which shows a lens-fitted film unit with a data recording device incorporated therein in accordance with an embodiment of the invention, the lens-fitted film unit (which is hereafter referred to as a film unit for simplicity) 1 has a unit housing 2 and an outside decorative cover 3 partly enclosing the unit housing 2. The unit housing 2 has a grip 4 at one of its end and a shutter button 10 at the top of the grip 4 and provided with a taking lens window 5, a lighting window 6, a front view finder window 7, a flash window 8, and a flash charge button 9 in the front wall and a frame counter window 11 for an indication of the number of available frames, and a window 12 for a lamp effecting an indication of completion of charging a flash in the top wall Further, the unit housing 2 at its back is provided with a film advance knob 13 and a rear view finder window 14. Part 15 of the front wall where the taking lens window 5, the lighting window 6 and part of the flash charge button 9 are mounted is elevated like a platform mount and separated vertically by a certain distance from the front view finder window 7 and a laterally by a certain distance from the grip 4. The grip 4 is swollen so as to fit the photographer to grip. The major portion of the unit housing 2 is made thin as well as possible and covered by a paper cover 3 having various openings as shown in FIG. 2.

Figure 2:
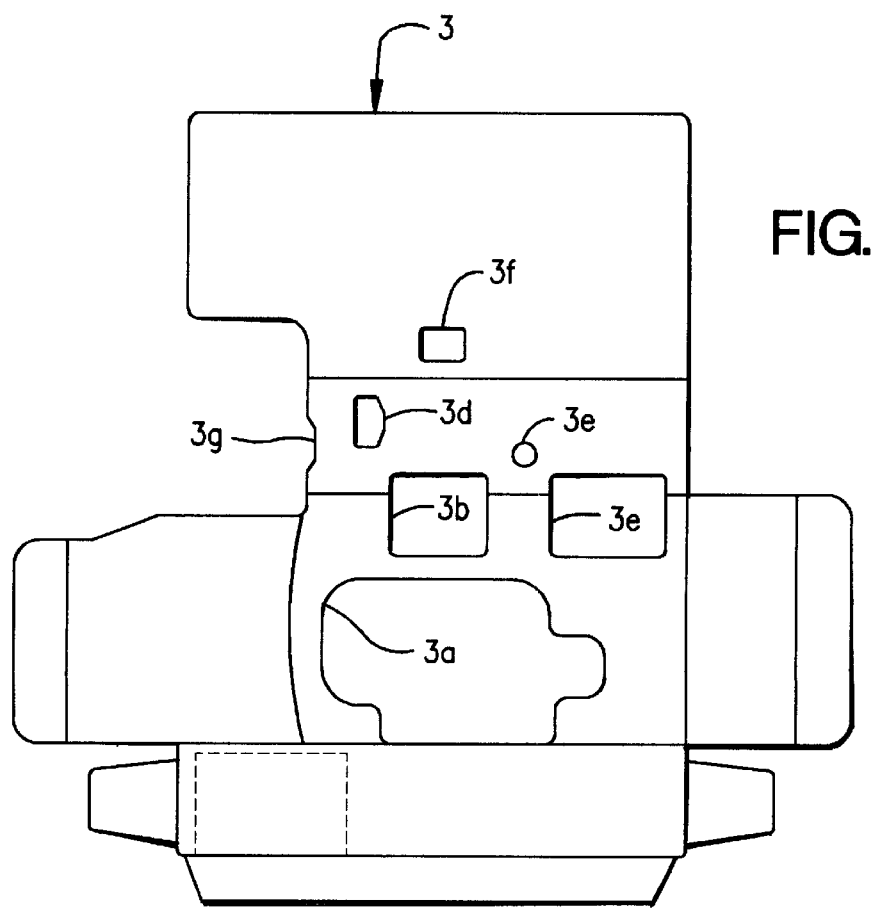
FIG. 2 is an developed view of an outside decorative cover.

As shown in FIG. 2, the outside decorative cover 3 is prepared as an expanded sheet and folded in a generally rectangularly-shaped box firmly covering the unit housing 2. The box-shape outside decorative cover 3 is glued at tabs 3h. The expanded outside cover sheet 3 is formed openings 3a–3g for the platform mount 15, the front view finder window 7, the flash window 8, the frame counter window 11, the flash charge lamp window 12, and a rear view finder window 14, respectively. The opening 3a is integrally shaped so as to expose the platform mount 15 and the flash charge button 9. The platform mount 15 is generally shaped so as to make it possible to form the openings 3b and 3c for the front view finder window 7 and flash window 8 with smallest separations from the opening 3a in the expanded outside cover sheet 3. The outside decorative cover 3 thus folded protects the interior of the unit housing 2 against foreign particles or dust.

Unit housing 2 has a light-tight rectangularly-shaped box shell comprising three separate sections, namely a front cover section 22, intermediate housing section 24 and a back cover section 23 fitted together. Various units, such as an exposure unit 27, a flash unit 26, a data module 27, and a 135 type of film cartridge unit 28 including a cartridge shell 29 and a filmstrip 31, are incorporated in the unit box 2, The intermediate housing section 24 is formed with a cartridge chamber 30 and a film chamber 32 in which the film cartridge shell 29 and a roll of filmstrip 31a are pre-loaded at the manufacturer. The film roll 31a may be formed on a spool (not shown). On end of the filmstrip 31 is attached to a cartridge spool 33 rotatable within the film cartridge shell 29 and rewound into the film cartridge shell 29 frame by frame every exposure. The film cartridge unit 28 may be of any other type. It is not always necessary that the filmstrip 31 is unwound out of the film cartridge shell 29 and rolled as a film roll 31a in the film chamber 32 at the manufacturer. In that case, the filmstrip 31 is unwound out of the film cartridge shell 29 and wound around the film spool in the film chamber 32 frame by frame every exposure.

Figure 3:
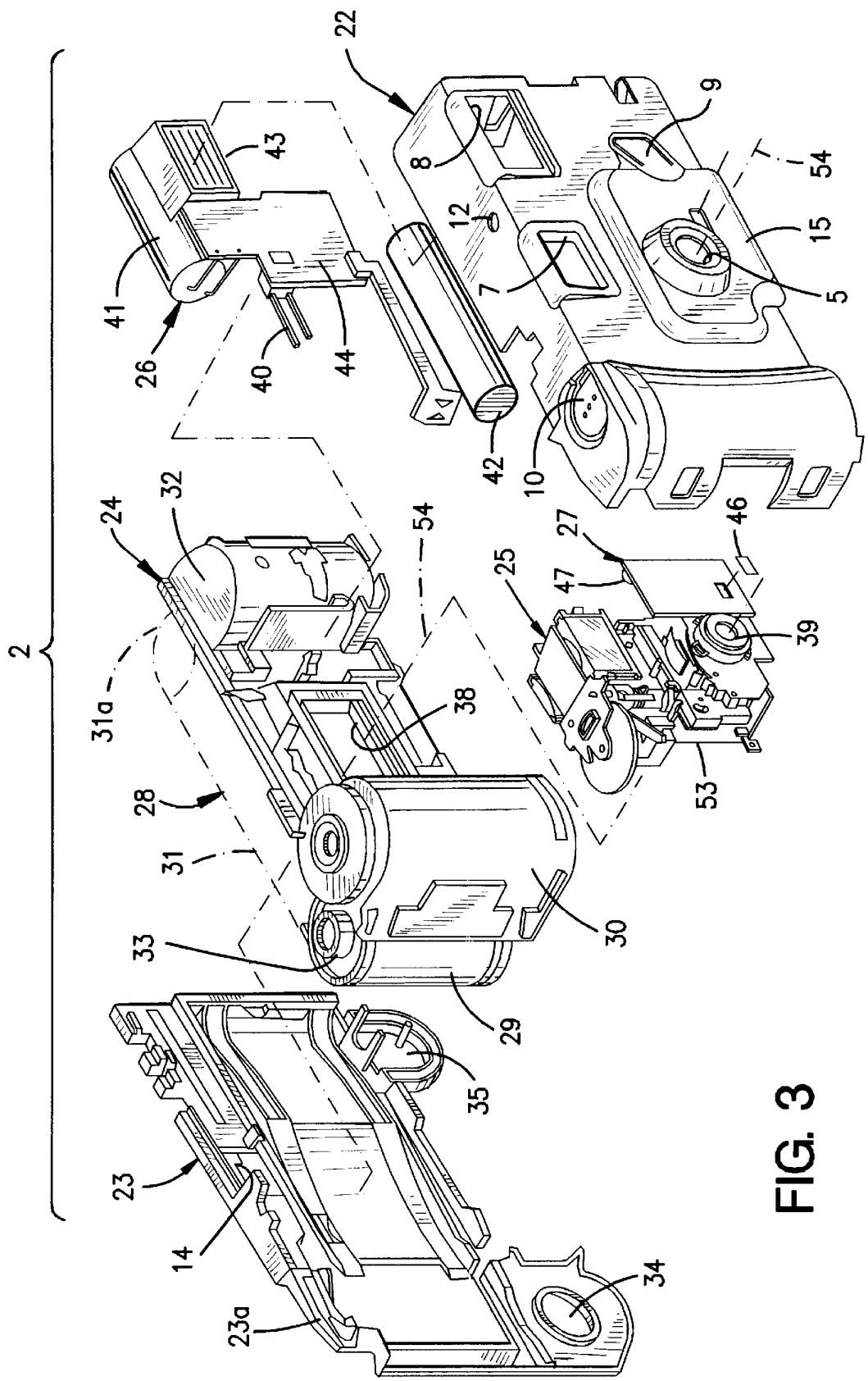
FIG. 3 is an exploded perspective view of the lens-fitted film unit.

Front cover section 22 at its top wall is provided with the shutter button 10 integrally formed as an integral part of the top wall and is formed with the flash charge lamp window 12. Further, the front cover section 22 at its front wall is formed with the platform mount 15, the flash charge button 9 formed as an integral part of the front wall, and the flash window 8. The back cover section 23 at its back wall is formed with the rear view finder window 14 and a slot 23a through which the film advance knob 13 partly appears out of the unit housing 2. This back cover 23 is detachably fitted to the intermediate housing section 24. The intermediate housing section 24 is formed with bottom openings at bottoms of the cartridge chamber 30 and the film chamber 32 which are closed by pull-top type of bottom lids 34 and 35 integrally formed with the back cover section 23. The bottom lid 34 is opened to take out the film cartridge shell 29 in which the whole length of exposed filmstrip 31 is received. The film advance knob 13, which is supported at the top of cartridge chamber 30 for rotation by the intermediate housing section 24, has an integral folk (not shown) at the underside thereof through which the film advance knob 13 engages with the cartridge spool 33. The film advance knob 13 is rotated in a counterclockwise direction as viewed in FIG. 3 to rewind successive exposed frames of the filmstrip 31 into the film cartridge shell 29. Between the cartridge chamber 30 and the film chamber 32 the intermediate housing section 24 is integrally formed with a rear half section 37 of a light tight exposure chamber 56 (see FIG. 5) which defines at its back an exposure frame aperture 38. The rear half section 37 is one of two mating exposure chamber halves. A front half section 53 of the light-tight exposure chamber 56 is integrally formed with the exposure unit 25 which is detachably fitted to the rear half section 37.

Exposure unit 25 has various exposure elements attached to the front half section 53 of the light-tight exposure chamber 56 such as a taking lens 39, a shutter mechanism, an automatic filmwind stop mechanism and a view finder optical system which are incorporated as one unit. The data module 27 is detachably fitted to the light-tight exposure unit 25. When the exposure unit 25 is fitted to the intermediate housing section 24, the front and rear half sections 37 and 53 forms a light-tight exposure chamber 56 within the unit housing 2. The light-tight exposure chamber 56 may be formed not by divided two halves but integrally with either one of the exposure unit 25 and the intermediate housing section 24.

Flash unit 26, which is removably disposed in a space formed in front of the film chamber 32 between the front cover section 22 and the intermediate housing section 24, includes a synchronizing switch 40, a power battery 42, a main capacitor 41, a power battery 43 and a wiring base board 44. While the flash charge button 9 remains depressed, the voltage of the power battery 42 Is elevated and charged in the main capacitor 41. In response to operation of the shutter mechanism, the synchronizing switch 40 is turned on to trigger a discharge tube to flash.

Figure 4:
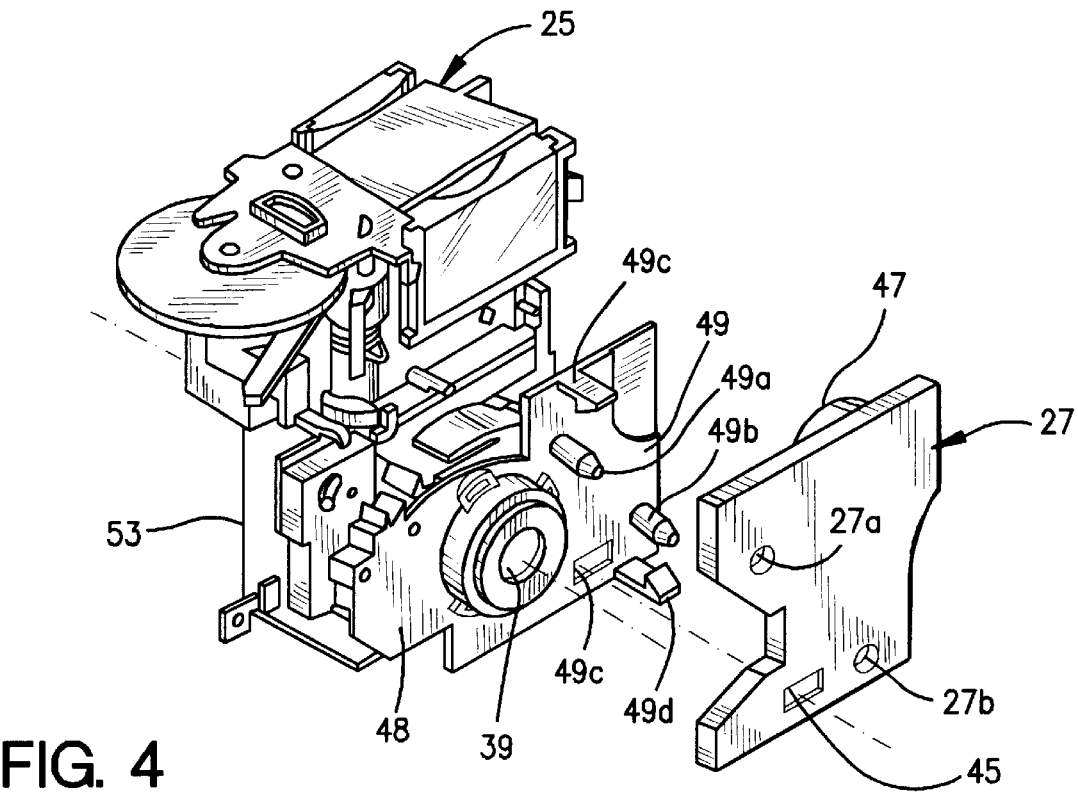
FIG. 4 is an explanatory view showing assembling a data module and an exposure unit.

Data module 27 has a module base plate on which various elements such as, a crystal oscillator, a clock circuit, LCD driver, a transmission type of liquid crystal display 45 for displaying characters and numbers, and a data reset switch, and a power battery 57. All these elements and battery are organized as one unit on the back side of the module base plate. Since the data module 27 has a flat surface at the front and an clear-cut square external shape, the platform mount 15 is made flat and neat. The clock circuit stores a calendar including calendar dates for several years ahead from now. The calendar date of year, month and day is definitely determined by counting clock pulses from a built-in standard pulse generator which is corrected by the crystal oscillator and indicated by the liquid crystal display 45. The data reset switch is provided for initial set of a calendar date. The data module 27 is initially adjusted on the basis of the date of production and has no access from the exterior of the film unit 1. The power battery 47 is of a button type and exchangeable when the data module 27 is removed from the film unit 1. The liquid crystal display 45 is disposed behind a condenser lens 46 in or adjacent to the lighting window 6 of the front cover 22 within the unit housing 2 and displays a six digit date of year, month and day. Each digit comprises seven liquid crystal display segments. Since the upper digit for month may be a number of "1" (one) only, two liquid crystal display segments arranged vertically may be sufficient. The liquid crystal display 45 is lit by means of the condenser lens 46, As shown in FIG. 4, at the front side of the exposure unit 25 a lens holder 48 is detachably fitted to hold the taking lens 39 and cover a shutter blade or blades as will be described in detail later. The lens holder 48 is provided, as an integral part, with a mount 49 for the data module 27 on the right side of part where the taking lens 39 is held. The data module 27 is fitted to the mount 49 by means of positioning pins 49a and 49b, holding hooks 49c and 49d. Further, the lens holder 48 is formed with a lighting opening 49e through which light transmitted through the liquid crystal display 45 passes backward. The data module 27 is formed in corresponding positions with positioning openings into which the positioning pins 49a and 49b are received when the data module 27 is fitted to the exposure unit 25 along an axial line 54. When the positioning pins 49a and 49b are fully received through their length, the data module 27 is engaged by the holding hooks 49c and 49d of the exposure unit 25. The data module 27 is further formed with a lighting opening in corresponding position to the liquid crystal display 45.

Figure 5:
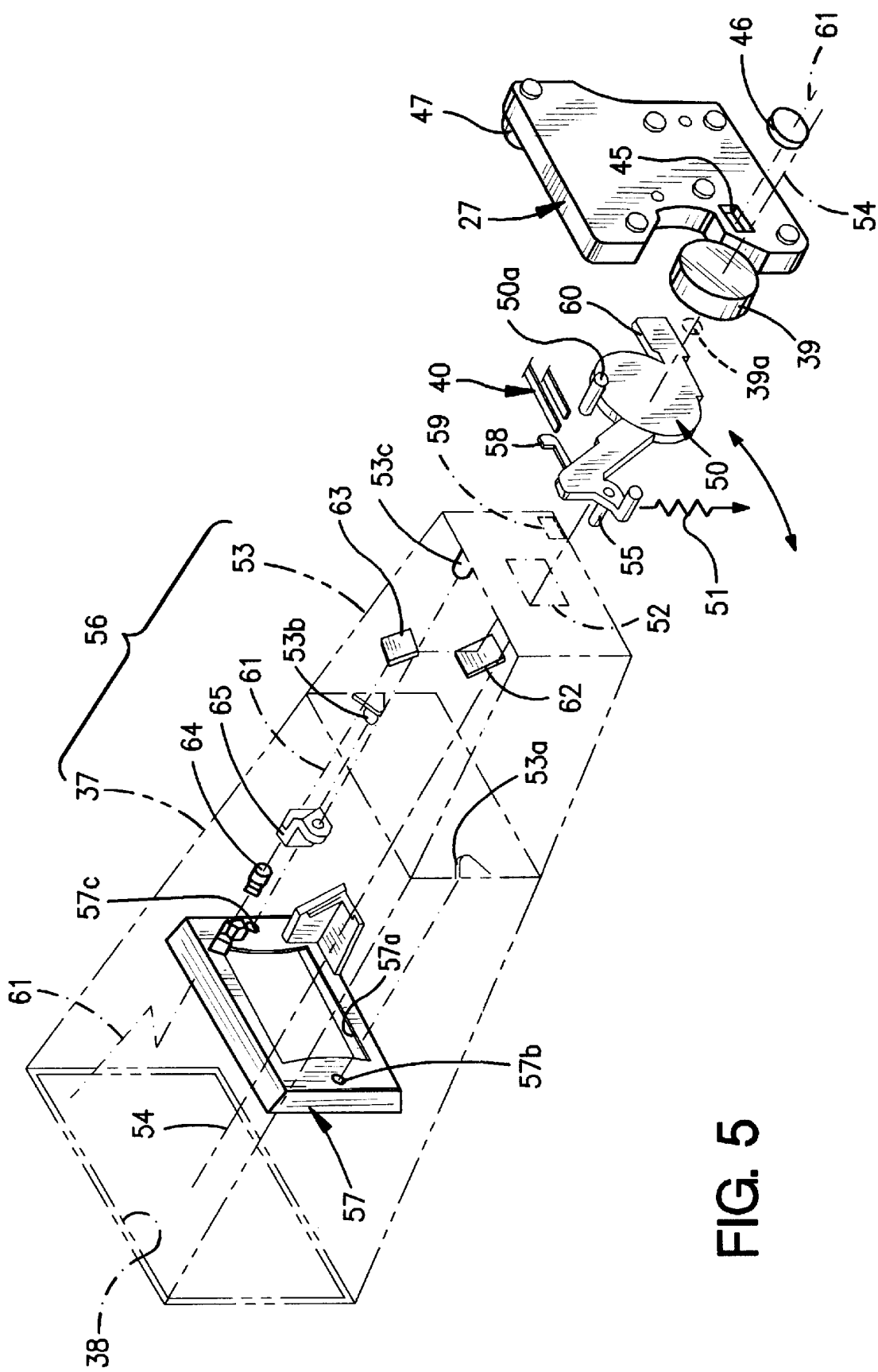
FIG. 5 is an elongated exploded perspective view of a data recording optical system.

As shown in FIG. 5, the exposure unit 25 has a fixed aperture stop 39a and a shutter blade 50 arranged in order from the front side behind the taking lens 39. The shutter blade 50 is pivoted by a pivot pin 55 for pivotal movement and urged by a return spring 51 toward its close position where the a subject exposure aperture 52 is closed This subject exposure aperture 52 is formed with its center in alignment with the optical axis of the taking lens 39 in the front board of front half section 53 of the light-tight exposure chamber 56. The shutter blade 50 is hit by a shutter lever (not shown) in response to operation of the shutter button 10 to turn against the return spring 51 and subsequently pulled back by the return spring 51 until it hits against the stop pin 50a, opening and closing the subject exposure aperture 52 for exposure. For the moment, light enters into the light-tight exposure chamber 56 and exposes the filmstrip 31 in the exposure frame aperture 38 to the light. At a full opening of the subject exposure aperture 52, the shutter blade 50 turns on the synchronizing switch 40 of the flash unit 26 by means of a hitting arm 58. While the shutter blade 50 opens and closes the subject exposure aperture 52, the light passing through the liquid crystal display 45 is introduced into the light-tight exposure chamber 56 through a data exposure aperture 59 formed separately from the subject exposure aperture 52 in the front board of the front half section 53 of the light-tight exposure chamber 56. This data exposure aperture 59 is formed lower right as seen from the front and opened and closed by a blade extension 60 formed integrally with the shutter blade 50 and at an opposite side to the pivot pin 55 with respect to the shutter blade 50. The light passing through the data exposure aperture 59 and introduced into the light-tight exposure chamber 56 is directed along an optical axis 61 of the data recording optical system to the filmstrip 31 in the exposure frame aperture 38 and exposes the filmstrip 31. The data recording optical system, which is disposed out of an effective path of image forming light passing through the taking lens 39 comprises two reflection mirror 62 and 63 facing each other and an imaging lens 64. In the light-tight exposure chamber 56 a light block frame 57 is disposed to define an effective exposure area 57a. The light block frame 57 is formed with holes 57b and 57c for receiving positioning pins 53a and 53b extending from the front half section 53 of the light-tight exposure chamber 56. After fitting and positioning the light block frame 57, the pin heads are caulked to secure the light block frame 57 to the light-tight exposure chamber 56.

Figure 6:
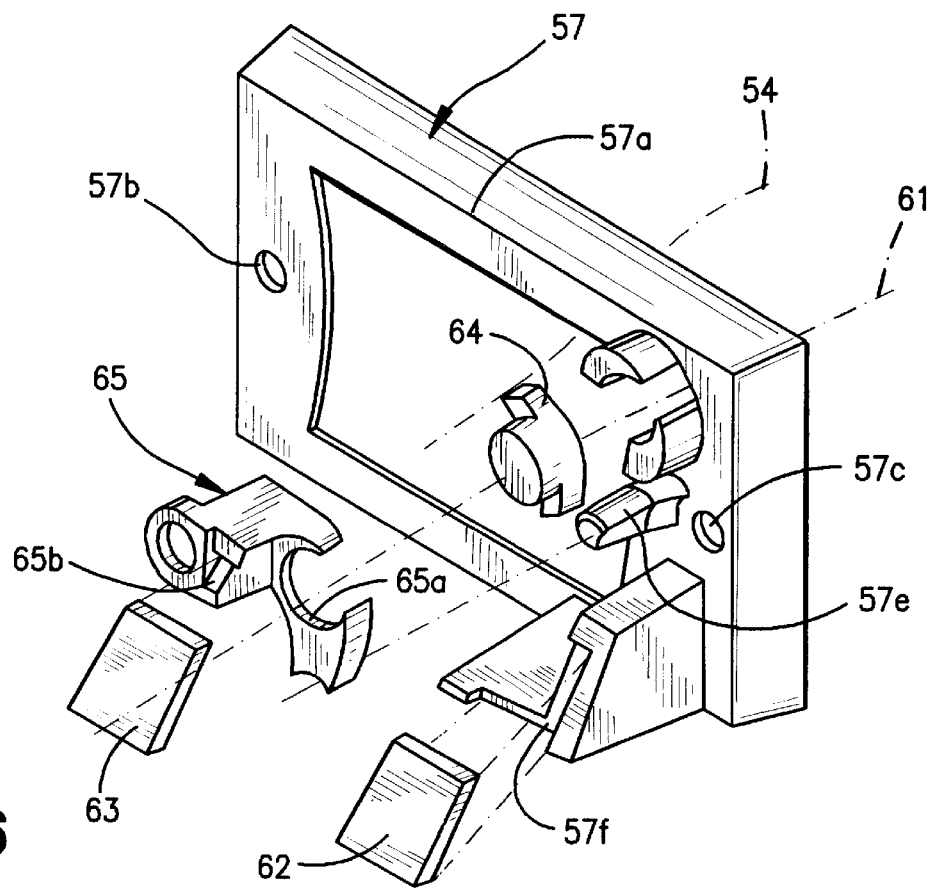
FIG. 6 is an exploded explanatory view showing the data recording optical system and light block frame.
Figure 7:
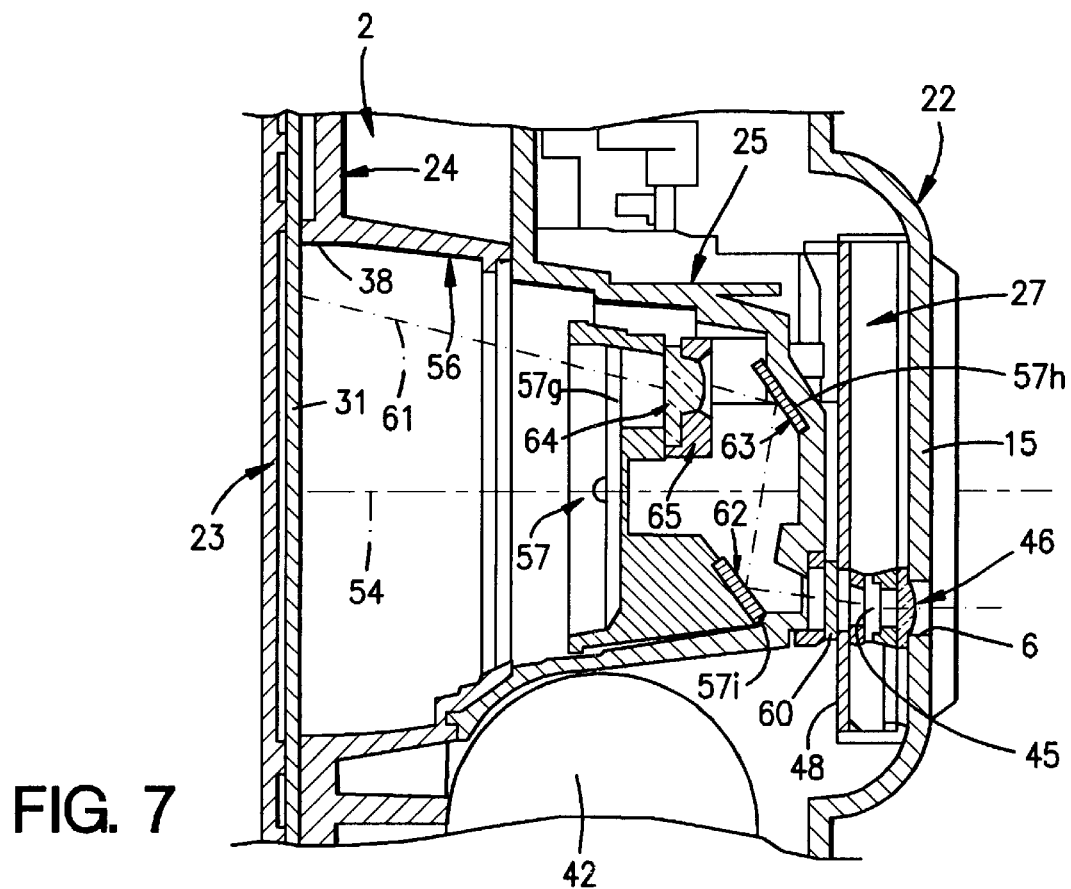
FIG. 7 is a cross-sectional view showing an optical path of the data recording optical system.

FIGS. 6 and 7 show data recording optical system. As shown, the reflection mirrors 62 and 63 are inserted into the light-tight exposure chamber 56 and placed in positioning recesses 57h and 57i, respectively. The reflection mirror 63 is held down by a member 65b formed integrally with positioning holder 65 which will be described later. This positioning holder 65 is held in position by means of positioning pin 57e extending from the light block frame 57 and a positioning pin 53c extending from the light-tight exposure chamber 56. The imaging lens 64 is inserted into a circular opening 65a formed in the positioning holder 65 and positioned in a direction of the optical axis 54 and a direction perpendicular to the optical axis 54 by a retainer member 57d formed on the light block frame 57. The reflection mirror 62 is retained by a retainer member 57f extending from the light block frame 57, As shown in FIG. 7, light passing through the liquid crystal display 45 is reflected upward by the mirror 62 and then reflected backward toward the light-tight exposure chamber 56 by the mirror 63. The imaging lens 64 focuses the light reflected by the mirror 63 at the upper right corner in a plane defined by the exposure frame aperture 38, In this manner, an image of a calendar date displayed by the liquid crystal display 45 is formed at the upper right corner in the focal plane, the calendar date image appears at a bottom corner of a picture when an exposure is made in an ordinary horizontal camera position and even in a vertical camera position, so that the data image does not overlap the face of a subject person, entirely nor partly, on the picture. The term "vertical camera position" as used herein shall mean and refer to a position in which the film unit 1 is held with the shutter button 10 positioned lower right as viewed from the photographer. In place of using two reflection mirror in the data recording optical system, a Z-shaped light guide optical member or a prism may be used. In such a case, the positioning member 65 can be removed, and the Z-shaped light guide optical member or the prism is held between the light-tight exposure chamber 56 and the light block frame 57. With this variation, light entering into the Z-shaped light guide optical member or the prism is totally and internally reflected, and hence prevented from escaping from the data recording optical system and traveling toward the effective exposure area.

In assembling operation of the film unit 1 described above, prior to assembling the film unit 1 at the manufacturer, a semi-assembly of the exposure unit 25 is prepared by incorporating the shutter mechanism, the automatic filmwind stop mechanism, the frame counter and the view finder optical system into the light-tight exposure chamber 53 from the top of the light-tight exposure chamber 53 and installed to and hooked by the intermediate housing section 24 from the front side. Subsequently, the shutter blade 50 are the return spring 51 are incorporated in this order to the semi-assembly of the exposure unit 25 so positioned as to place the side of the taking lens 36 up. Thereafter, the flash unit 26 is placed from the upside of the intermediate housing section 24 and attached to the intermediate housing section 24, with the result of placing the synchronizing switch 40 in the track of movement of the shutter blade. The lens holder 48 attached with the taking lens 39 is subsequently placed from the upside of the intermediate housing section 24 and attached to the intermediate housing section 24.

Thereafter, the data module 27 is placed from the upside of the intermediate housing section 24 and attached to the lens holder 48 by fitting the positioning holes 27a and 27b onto the positioning pins 49a and 49b of the lens holder 48, respectively. When fully inserting the positioning pins 49a and 49b in the positioning holes 27a and 27b, the data module 27 is appropriately positioned with respect to and held by the exposure unit 25. After placing the condenser lens 46 on the liquid crystal display 45, the front cover 22 is attached to the intermediate housing section 24 to hold the condenser lens 46. As aparent from the assembling manner, the essential elements or parts, including the exposure unit 25, the flash unit 26, the lens holder 48, the condenser lens 46 and the front cover section 22, are assembled in this order in one direction from the upside to the intermediate housing section 24 with the front side directed upward. This arrangement makes automatic semi-assembling quite easy. Thereafter, the data recording optical system is incorporated in the semi-assembly of film unit from the back of the intermediate housing section 24. Specifically, the optical elements, i.e, the reflection mirrors 62 and 63, the positioning member 65, the imaging lens 64 and the light block frame 57, are incorporated in this order into the light-tight exposure chamber 65 of the intermediate housing section 24 placed upside down.

The semi-assembly of the film unit 1 is loaded with a film cartridge unit 28 in a darkroom. Specifically, the film cartridge unit 28 is prepared as an unexposed film roll 31a and an empty film cartridge shell 29. The leading end of the film roll 31a is secured to the cartridge spool 33 in the film cartridge shell 29. While the empty film cartridge shell 29 is put in the cartridge chamber 30, the film roll 31a is put in the film chamber 32. Thereafter, the back cover section 23 is attached to the intermediate housing section 24, and the bottom openings of the chambers 30 and 32 are subsequently closed by the lids 34 and 35, respectively to complete a film unit housing as a semi-finished film unit 1. Finally, the unit housing 2 is enclosed with the outside decorative cover 3 as a complete film unit 1.

In photographic operation of the film unit 1, prior to a first exposure, when the film advance knob 13 is rotated until it is locked by means of the automatic filmwind stop mechanism, the first film frame is automatically positioned in the exposure frame aperture 38 and the film unit 1 is put ready for exposure. In response to depression of the shutter button 10, the shutter blade 50 is quickly turned about the pivot pin 55 to instantaneously open and close both exposure apertures 52 and 59, to expose the film frame to the light passing through the taking lens 39 and the data recording system. That is, the film frame is exposed to a subject image and a calendar date images simultaneously. In order to provide a proper exposure, the impact force applied by the shutter button 10 to turn the shutter blade 50 and the restoring force of the return spring 51 are appropriately designed so as to make the shutter blade 50 open the fixed aperture stop 39a for a time necessary to make a proper exposure. The amount of light for exposure of calendar date image is unconditionally determined by the time for which the shutter blade 50 remains open. For this reason, the condenser lens 46 is placed before the liquid crystal display 45 to collect light reaching the film frame as much as possible. As a result, the imaging lens 64 forms a clear calendar data image on the film frame. In cases where there is a demand for a flash exposure, the flash charge button 9 is depressed prior to make an exposure. When charging the main condenser 41 is completed, the lamp in the flash charge lamp window 12 is lit. After checking the indication of completion of charge, the shutter button 10 is depressed with the result of turning on the synchronizing switch 40 to illuminate a subject with flash light during opening of the data exposure aperture 59 and the fixed aperture stop 39a to execute an exposure of the first film frame of the filmstrip 31. Simultaneously, the flash light reflected by the subject partly enters into the data recording optical system through the liquid crystal display 45 behind the lighting window 6 and exposes the first frame of the filmstrip 31. With the flash exposure, a calendar date is definitely recorded on the filmstrip 31 even during an exposure in the dark.

After every exposure, the film advance knob 13 is rotated until it is locked by means of the automatic filmwind stop mechanism to place another film frame in position in the exposure frame aperture 38. The same operations are repeated for every exposure. When the filmstrip 31 is fully exposed, the frame counter releases the automatic filmwind stop mechanism to permit rewinding of the filmstrip 31 into the film cartridge shell 29.

The film unit 1 containing the film cartridge unit 28 with the exposed filmstrip 31 rewound in the film cartridge shell 29 is forwarded to a photo-shop or a photo-laboratory, The film cartridge unit 28 is unloaded through the bottom of the cartridge chamber 31 with the bottom lid 34 opened and processed in a photo-processor to develop the exposed filmstrip 31. The developed filmstrip 31 is further processed in a printer to make prints therefrom. A set of the developed filmstrip 31 and the prints are returned to the customer. The print shows the calendar date image at the lower right when the picture is taken by the film unit 1 held in the horizontal camera position or at the lower left, which is an agreeable position, when the picture is taken by the film unit 1 held in the vertical camera position.

The film unit 1 with the film cartridge unit 28 is collected and sent to the manufacturer and recycled. In this instance. Because the exposure unit 25, the flash unit 26 and the data module 27 are protected between the front and back cover sections 22 and 23 of the unit housing 2, they are collected without accompanied by such damages as to affect their qualities and available as they are. The battery of the data module 27 is replaced with a new one.

Almost of all parts and/or units of the film unit 1 are available even for lens-fitted film units of the type having no data recording device. In this instance, the front cover section 22 is simply worked to close the lighting window 6, directly or indirectly. Some types of lens-fitted film units do not have a flash unit. Further, almost of all parts and/or units of the film unit 1, excepting the front cover section 22, are available even for lens-fitted film units of the type having no flash unit.

Figure 8:
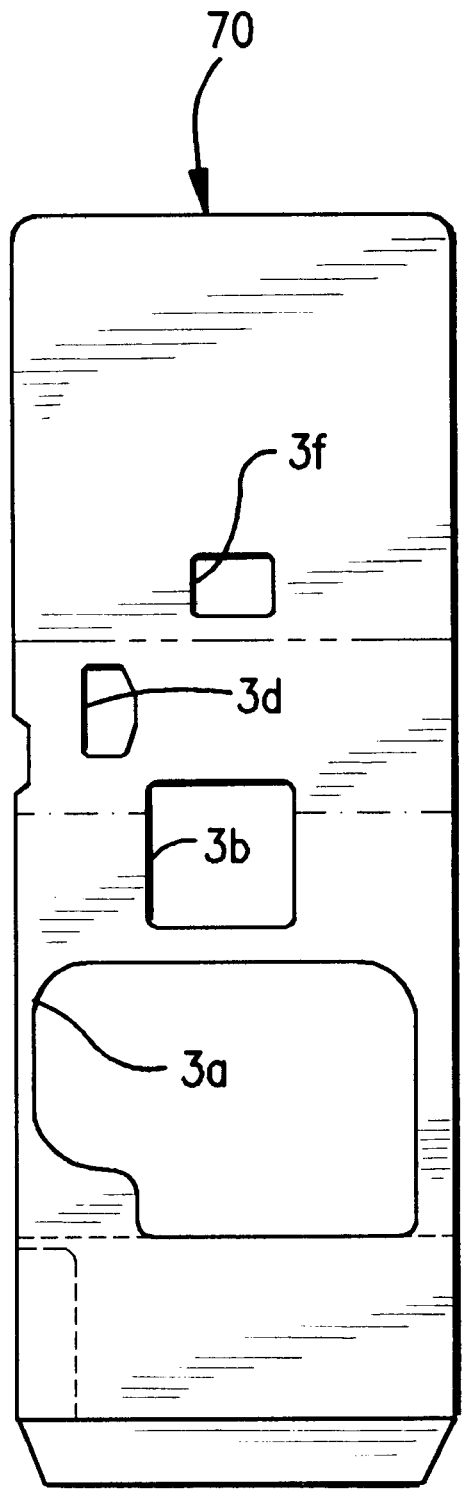
FIG. 8 is a developed view of a modified outside decorative cover.

The outside decorative cover 3 may be modified as a simple as shown in FIG. 8. As shown in the figure, the developed outside decorative cover 3 is made of an elongated rectangularly-shaped web 70 formed with necessary openings 3a, 3b, 3d and 3f for the platform mount 15, the front view finder window 7, the frame counter window 11 and the rear view finder window 14, respectively. The outside decorative cover 70 is simply rolled around the central portion of the unit housing 2. In this instance, the web-like outside decorative cover 70 is simply glued at both ends. Otherwise, the web-like outside decorative cover 70 may be pasted, entirely or partly, with a gummed label. The opening 3a for the platform mount 15 may be an open ended opening.

Figure 9:
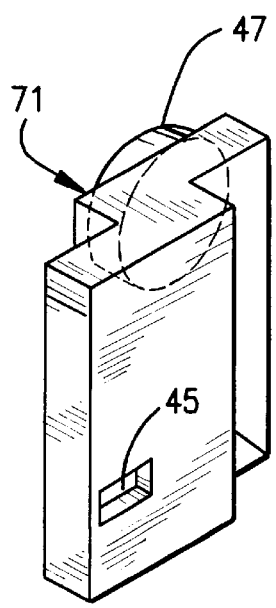
FIG. 9 is a schematic view of a data module with a power battery attached vertically.
Figure 10:
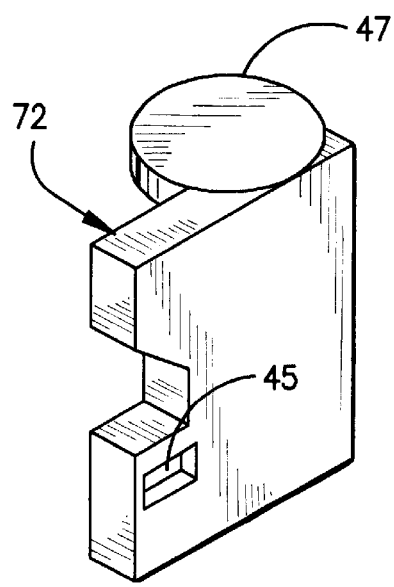
FIG. 10 is a schematic view of a data module with a power battery attached horizontally.
Figure 11:
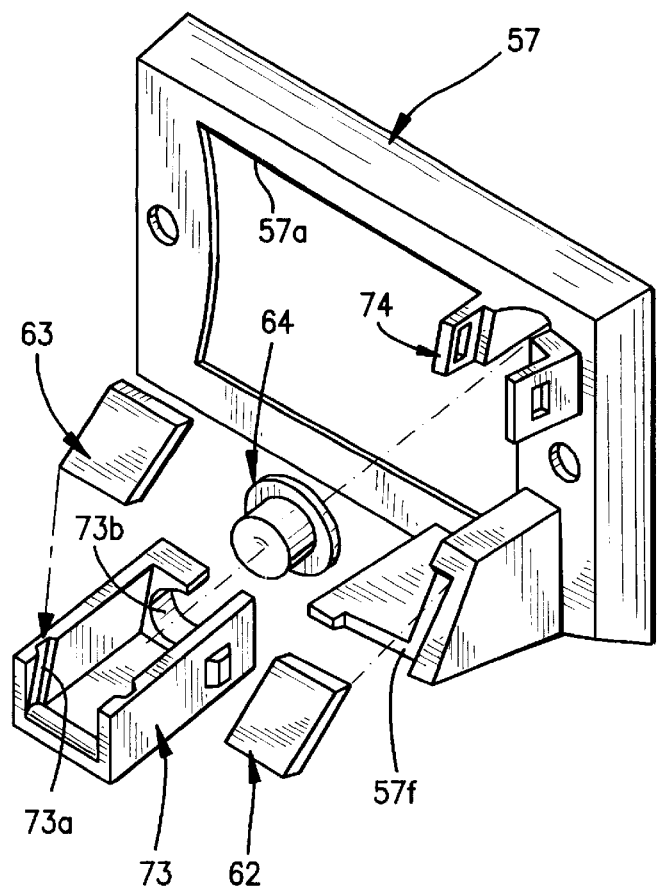
FIG. 11 is an exploded explanatory view showing a variation of a light block frame to which a data recording optical system is partly attached.

In order to reduce a shadow area of the data module 27 as viewed from the front, a two-step module base plate 71 such as shown in FIG. 9 may be used. In this instance, the two-step module base plate 71 holds a power battery 47 on the lower step. Further, as shown in FIG. 11, a module base plate 72 holds a power battery 47 placed horizontally at the top thereof. This type of data module enables the battery to be installed in a space formed between the module base plate 72 and the wiring base board 44 of flash unit 26.

The data recording optical system may be attached, entirely or partly, to the light block frame 57. As shown in FIG. 11, the data recording optical system is held partly by the light block frame 57 and partly between the light-tight exposure chamber 56 and the light block frame 57. The light block frame 57 is integrally formed with a retainer 74 on which a lens holder 73 is slid to be brought into engagement in an axial direction. The lens holder 73 has a U-shaped cross section. Further, the lens holder 73 is formed near the front end with a groove 73a into which the reflection mirror 63 and is formed at the rear end with a hole 73b in which the imaging lens 64 is put. The imaging lens 64 put in the end hole 73b is held between the rim of the hole 73b and the light block frame 57. In this instance, the reflection mirror 62 is held between the light-tight exposure chamber 56 and the light block frame 57 as shown in FIG. 6.

Figure 12:
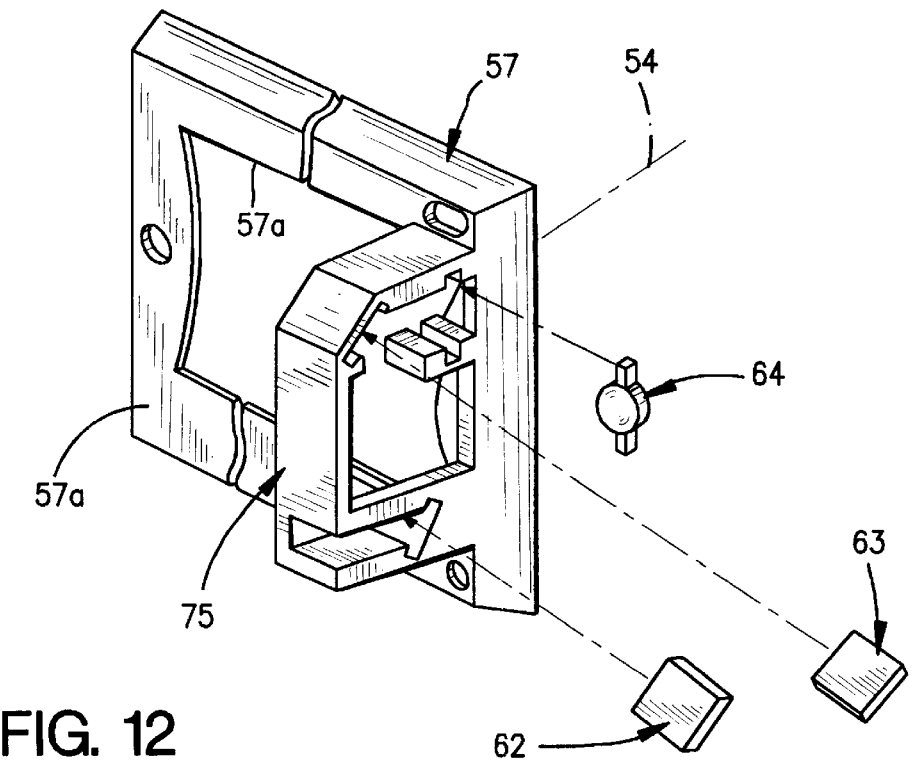
FIG. 12 is an exploded explanatory view showing another variation of a light block frame to which a data recording optical system Is partly attached.

FIG. 12 shows another variation in which the data recording optical system is held entirely by the light block frame 57. In this instance, the light block frame 57 is integrally formed with a lens holder 75 which holds the reflection mirrors 62 and 63 and the imaging lens 64 in proper position. The data recording optical system is inserted into the lens holder 75 in a direction perpendicular to the optical axis 54 and subsequently secured to the inner wall of the light-tight exposure chamber 56.

As described above, because the unit housing 2 is constructed to hold the data recording optical system between the inner wall of the light-tight exposure chamber 56 and the light block frame 57, it is eliminated to provide an extra lens holder, and is possible to lower down manufacturing costs, The data recording optical system is handled after assembled, entirely or partly, to the light block frame 57 according to the variations shown in FIGS. 11 and 12, or to the light-tight exposure chamber 56 of the exposure unit 25 according to the variation shown in FIG. 6, it is endowed with improved convenience of assembly and time-saving quality control.

Figure 13:
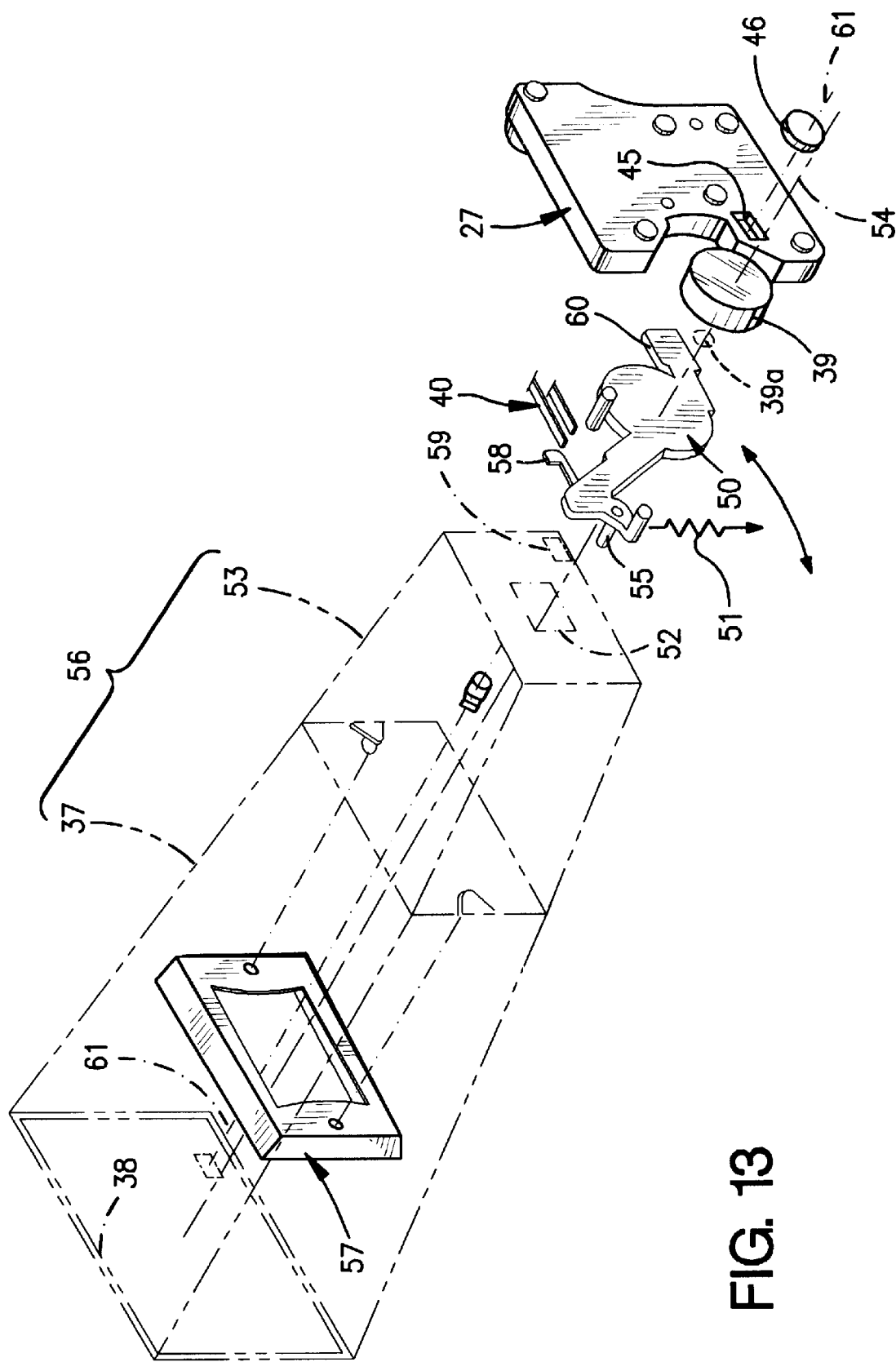
FIG. 13 is an elongated exploded perspective view of a variation of the data recording optical system.

In place of the data recording optical system comprising the Imaging lens 64 and the two reflection mirrors 62 and 63 shown in FIG. 5, only the imaging lens may be used as a data recording optical system as shown in FIG. 13. In this instance, an image of the calendar data displayed by the liquid crystal display 45 is formed at the lower right corner in the focal plane as viewed from the front side.

Figure 14:
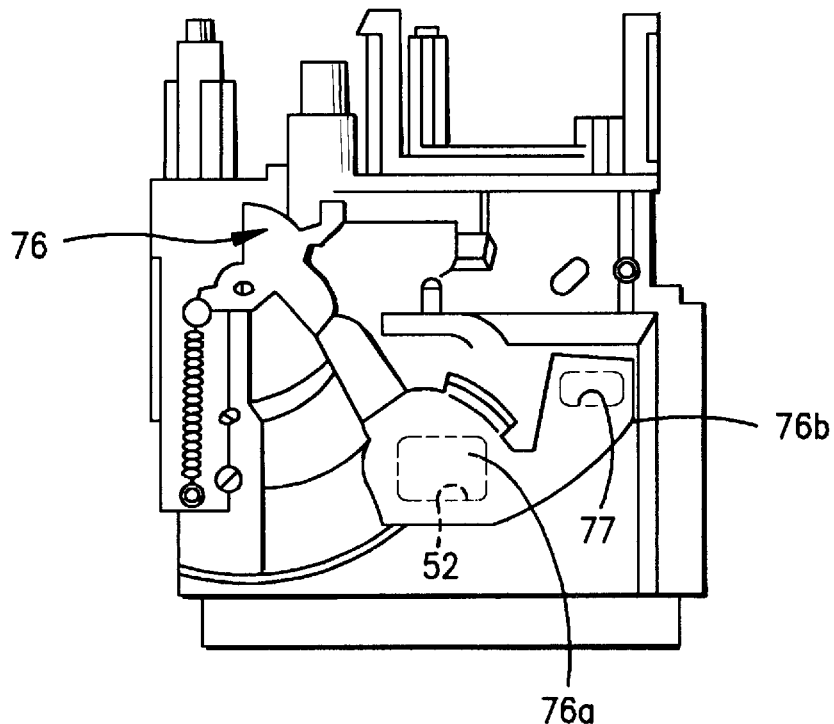
FIG. 14 is a front view of the exposure unit.
Figure 15:
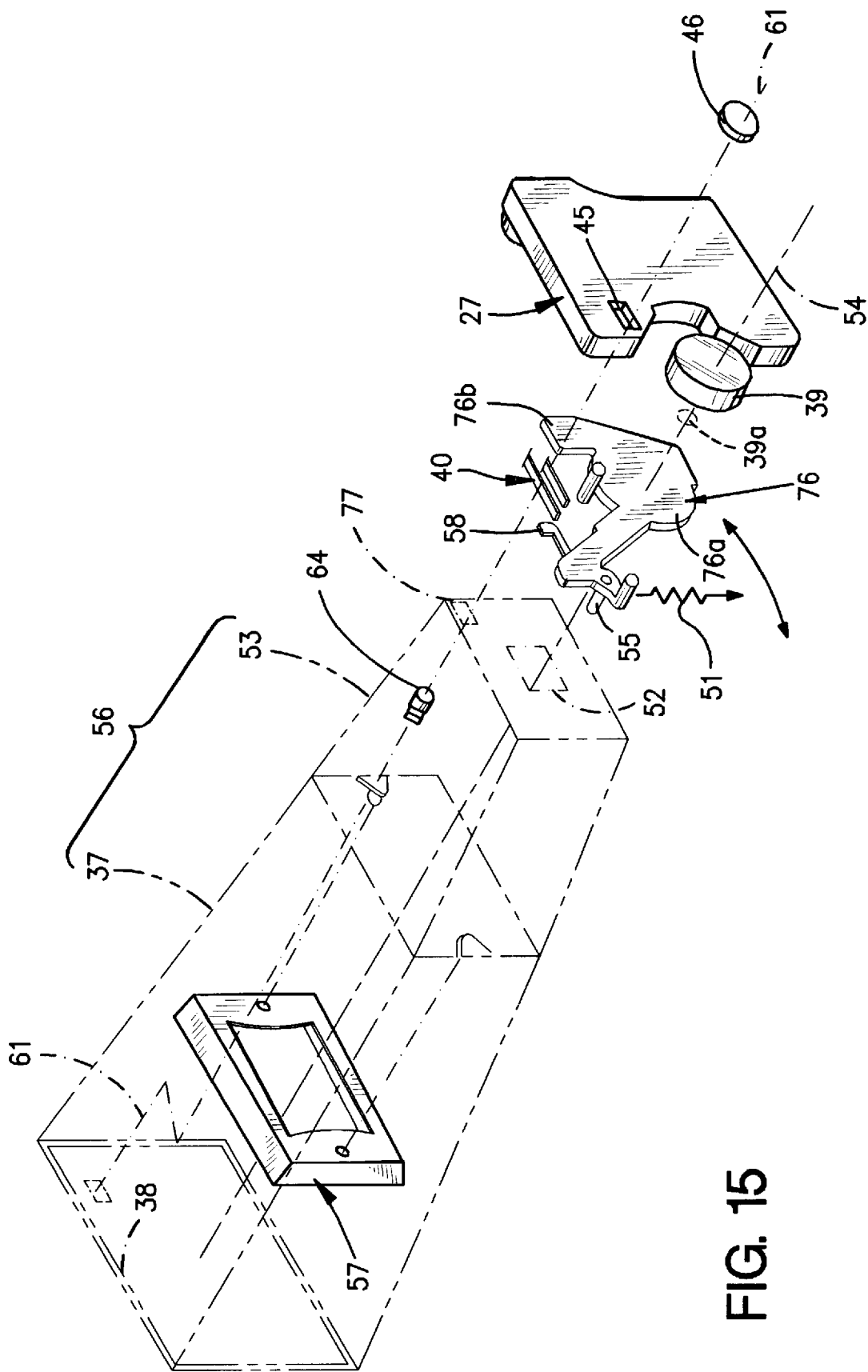
FIG. 15 is an elongated exploded perspective view of another variation of the data recording optical system.

In place of the data exposure aperture 59 for the data recording optical system positioned on the lower right side of the shutter blade 50 for the taking lens, shown in FIG. 5, a data exposure aperture 77 may be positioned on the upper right side of the shutter blade 50 as shown in FIG. 14. The shutter blade 76 shown in FIG. 14 has a blade section 76a for opening and closing the subject exposure aperture 52 and a blade extension 76b for opening and closing the data exposure aperture 77. With this variation, as shown in FIG. 15, light passing through the data exposure aperture 77 enters into the light-tight exposure chamber 56 at the upper right corner and reaches the exposure frame aperture 38 at the upper right corner. A calendar date image appears on a print at a lower corner, which is an agreeable position, when the picture is taken by the film unit 1 held in the horizontal camera position.

Figure 16:
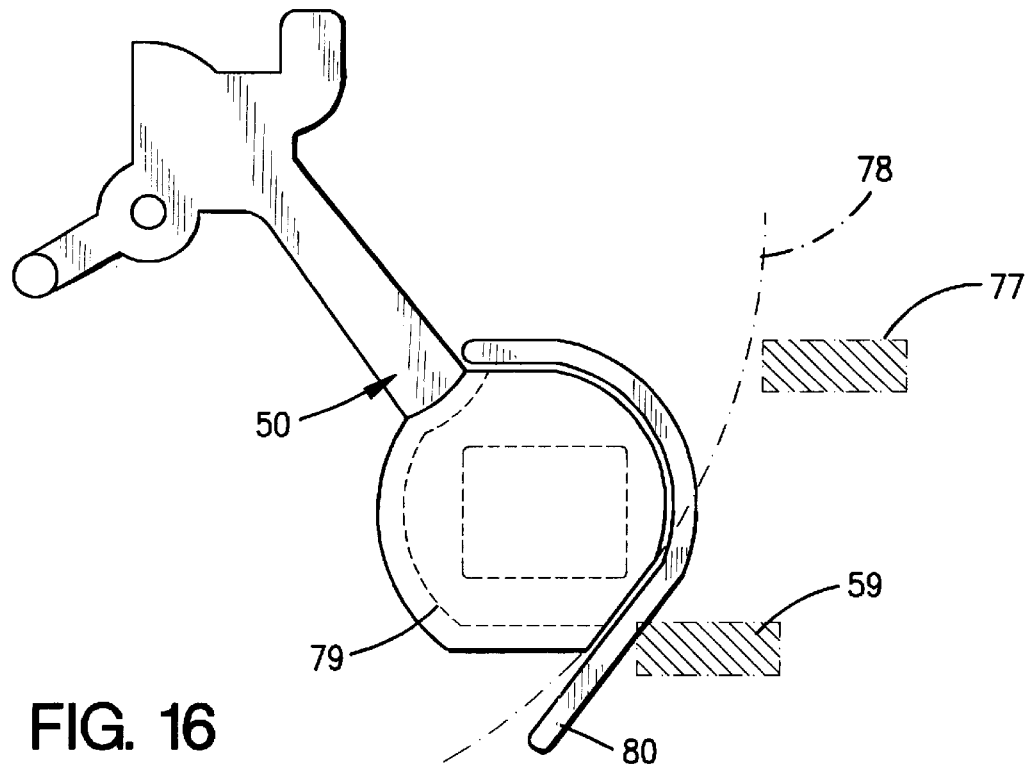
FIG. 16 is an explanatory plan view showing a positional relationship between the subject exposure aperture and the data exposure aperture.

FIG. 16 shows the positional relationship between the data exposure apertures 59 and 77 for calendar data exposure shown in FIGS. 5 and 14, respectively. An area covered by the shutter blade 79 opening and closing the subject exposure aperture 52 is defined by a line 78. Both data exposure apertures 59 and 77 are positioned out of the area. The subject exposure aperture 52 is formed in the surface elevated up from the remaining surface of the front wall of the light-tight exposure chamber 56. As shown, when the shutter blade 50 is closed, a light block rib 79 at the back of the shutter blade 50 encloses a step between the uneven surface and cooperates with a light block rib 80 formed on the front wall of the light-tight exposure chamber 56 to encircle a space around the shutter aperture 52, preventing light from entering the space.

Figure 17:
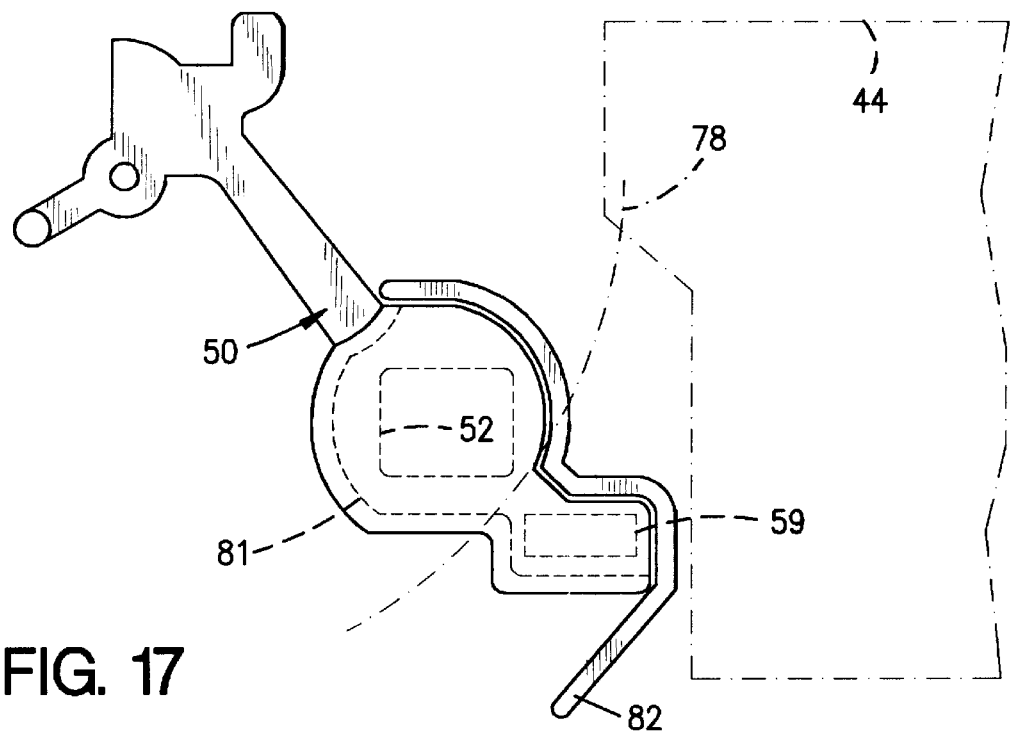
FIG. 17 is an explanatory plan view showing another positional relationship between the subject exposure aperture and the data exposure aperture.

FIG. 17 shows a detailed layout of the shutter blade 50 and subject exposure aperture 52 shown in FIG. 5. The shutter blade 50 at its back is formed with a light block rib 81 which cooperates with a light block rib 82 formed on the front wall of the light-tight exposure chamber 56 to block light entering a space between the exposure apertures 52 and 59. Further, a space between area covered by the shutter blade 50 and a base plate 44 of the flash unit 26 is narrower when the subject exposure aperture 52 is closed position than when it is opened. Accordingly, In the case where the data exposure aperture 77 is arranged upper right from the subject exposure aperture 52 as shown in FIG. 14, the flash unit base plate 44 is pushed outward, resulting in a large size of film unit. That is to say, the data exposure aperture 59 positioned as shown in FIG. 5 is effective in reducing the size of film unit.

Figure 18:
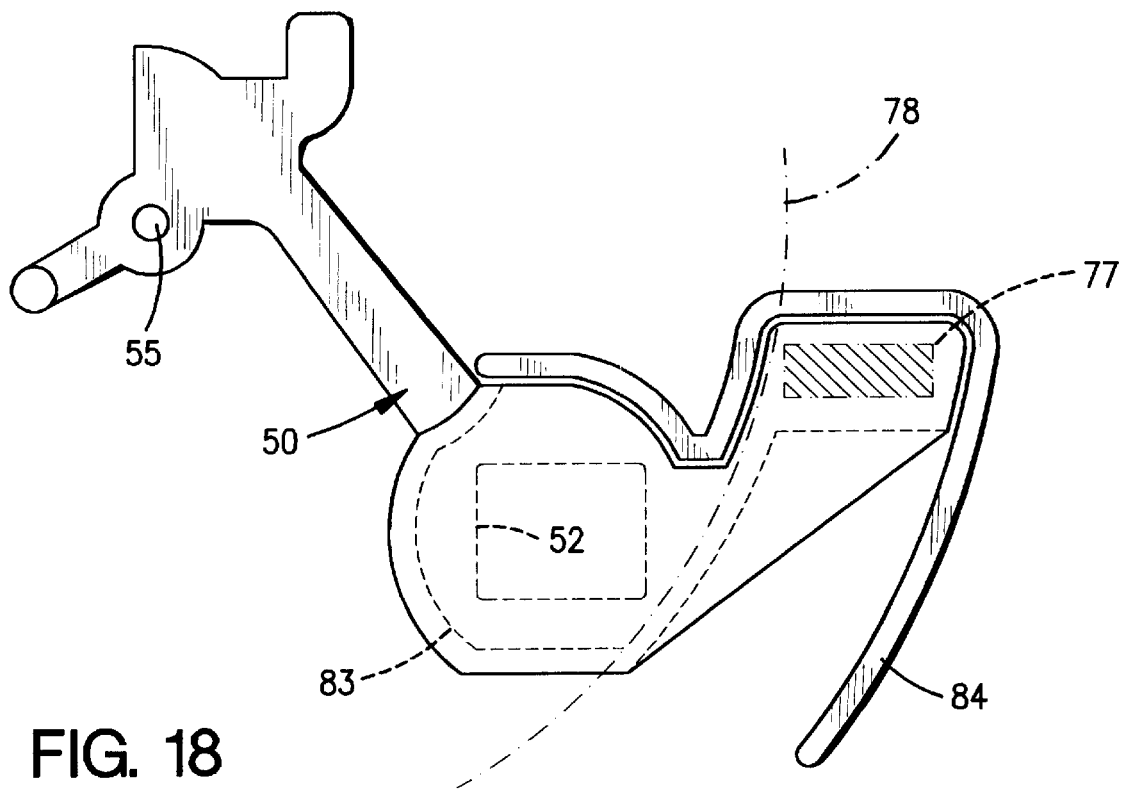
FIG. 18 is an explanatory plan view showing still another positional relationship between the subject exposure aperture and the data exposure aperture.
Figure 23:
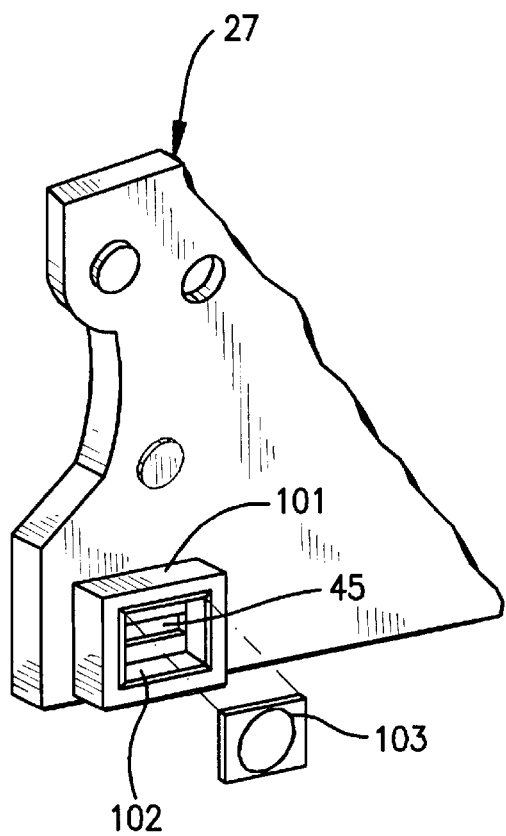
FIG. 23 Is an exploded perspective explanatory view showing a variation of positioning the condenser lens.

FIG. 18 shows a detailed layout of the shutter blade 50 and subject exposure aperture 52 shown in FIG. 14. A light block rib 83 at the back of the shutter blade 50 and a light block rib 84 formed on the front wall of the light-tight exposure chamber 56 cooperates with each other to block light entering a space between the exposure apertures 52 and 77. As was previously described above, although the placement of data exposure aperture 77 makes the film unit large in size, it places the calendar date image at an lower corner of a print, which is an agreeable position, when the picture is taken by the film unit 1 held in the horizontal camera position.

Figure 19:
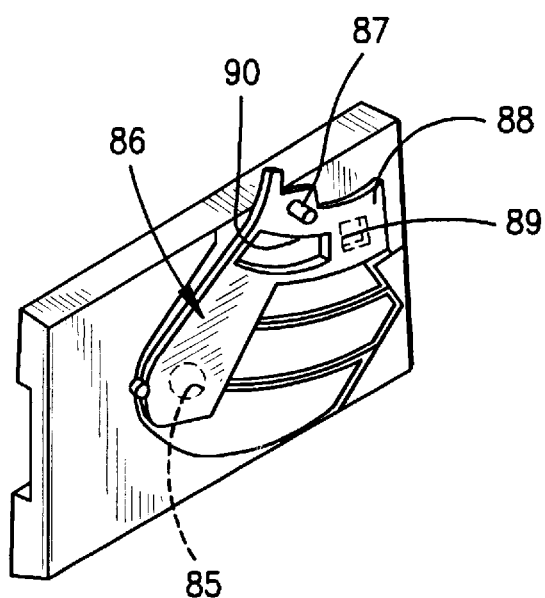
FIG. 19 is a front view showing a variation of the shutter blade.

As shown in FIG. 19, the pivot pin 87 of the shutter blade 86 and the blade extension 88 may be placed on the same side with respect to the subject exposure aperture 85. In this instance, the data exposure aperture 89 is formed upper right from the subject exposure aperture 85 in the front wall of the light-tight exposure chamber 56. The shutter blade 86 turns in counterclockwise direction as viewed in FIG. 19 and covers the data exposure aperture 89 during opening and closing the subject exposure aperture 85 Accordingly, although the shutter blade 86 has no need to have a blade extension for opening and closing the data exposure aperture 89, it is formed with an elongated opening 90 in conformity in size with the data exposure aperture 89.

Figure 20:
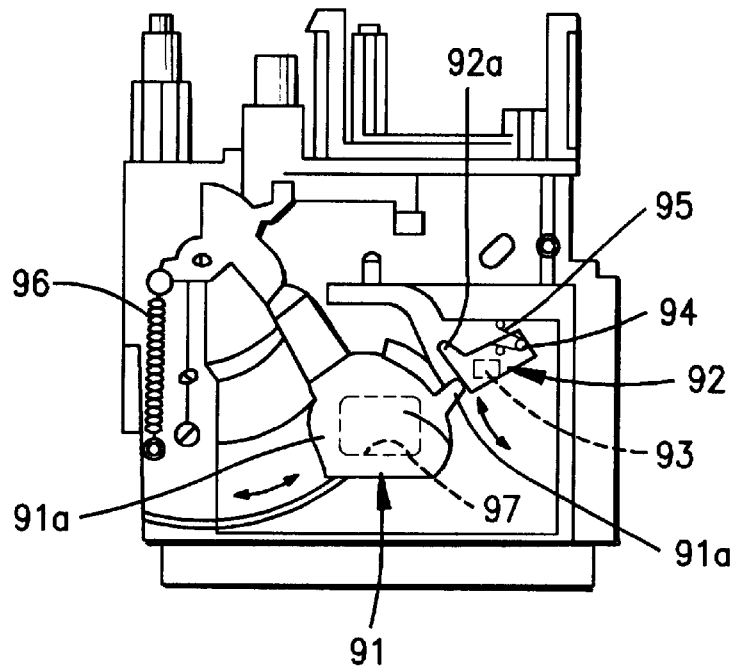
FIG. 20 is a front view of a variation of the exposure unit.

As shown in FIG. 20, in place of the blade extension 60 shown in FIG. 5, an extra shutter blade 92 may be provided separately from the shutter blade 91 so as to cooperate with the shutter blade 91 to open and close the data exposure aperture 93. The shutter blade 92, which is pivoted on a pin 94 secured to the front wall of the light-tight exposure chamber 56, is ordinarily pushed by means of a projection 91a of the shutter blade 91 to close the data exposure aperture 93. When the shutter blade 91 turns to open the subject exposure aperture 97, the shutter blade 92 is forced to turn by spring 95 to open the data exposure aperture 93. As the shutter blade 91 is returned by a return spring 96 to its closed position, the shutter blade 91 brings Its projection 91a into contact to a projection 92a of the shutter blade 92. As a result, the shutter blade 92 is returned to cover the data exposure aperture 93.

Figure 21:
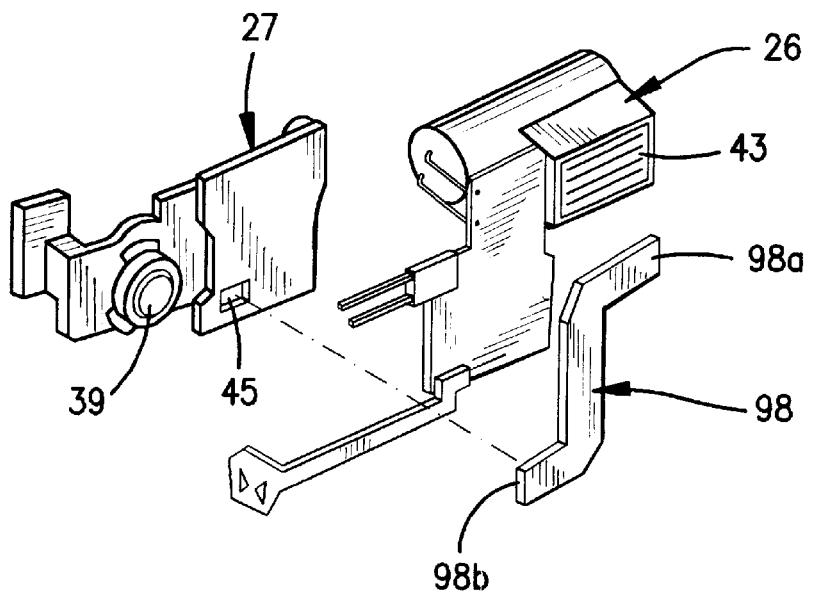
FIG. 21 is an exploded perspective view of the flash unit and the exposure unit.

FIG. 21 shows a variation of a data recording device in which the utilization is made of flash light to record a calendar date on the filmstrip 31. As shown in the figure, an optical light guide member 98 is attached to the inner surface of the front cover section (not shown) so as to face the lower end section of the flash unit window 43 at one of its ends and the liquid crystal display 45 at another end 98b. Flash light emanating from the flash unit 26 enters the optical light guide 98 at the one end 98a and guided to the other end 98b. The light exiting from the optical light guide 98 then illuminates the liquid crystal display 45. In this instance, the flash charge button 9 is preferably adapted to be of a single touch re-charge type so as to always make flash exposure, In this instance, the front cover section 22 has no need to be formed with the lighting window 6.

Figure 22:
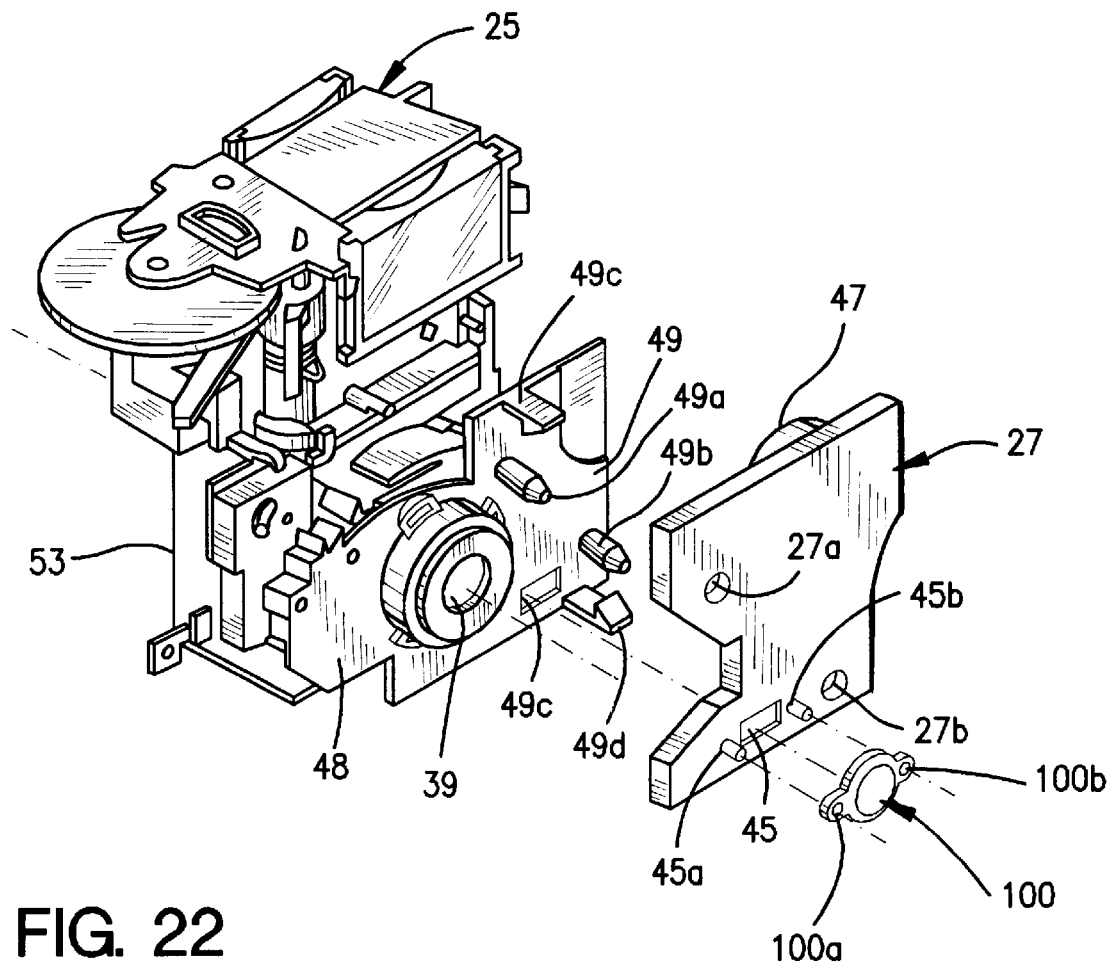
FIG. 22 is an exploded perspective explanatory view showing positioning the condenser lens.

FIG. 22 shows a variation of positioning the condenser lens of the data recording optical system. As shown, a condenser lens 100 is formed with integral radial arms 100a and 100b having positioning holes. This condenser lens 100 is fitted and positioned with respect to the liquid crystal display 45 of the data module 27 by fitting the holes of the arms 100a and 100b onto positioning pins 45a and 45b fixed on both sides of the liquid crystal display 45. In this instance, the condenser lens 100 is firmly held between the data module 27 and the front cover section 22. After assembling the data module 27 to the intermediate housing section 24, the condenser lens 100 is attached to the data module 27 from the front, and the front cover 22 is subsequently attached to the intermediate housing section 24. The essential elements, i.e, the exposure unit 25, the flash unit 26, the lens holder 48, the data module 27, the condenser lens 100 and the front cover 22 are assembled in this order and in the same direction to the intermediate housing section 24 placed, for example, upside down. Accordingly, this structure makes it easy to automatic assemble of the film unit 1.

The condenser lens may held as shown in FIG. 21. As shown, the data module 27 is formed with an integral frame 101 surrounding the liquid crystal display 45 for holding a condenser lens 101 therein. The condenser lens 101 is positioned in axial direction by means of a shoulder 102 of the frame 101. The shoulder 102 may be of a rectangular shaped, or otherwise of a circular shape.

Although the present invention has been described in detail by way of example with reference to the accompanying drawings, it is to be understood that various variants and modifications may occur to those skilled In the art. Such variants and modifications otherwise depart from the scope of the present invention, they are intended to be covered by the following claims.

What is claimed is:

1. A lens-fitted film unit having a light-tight film unit housing, a film cartridge loaded in said light-tight film unit housing and a data recording module incorporated in said light-tight film unit housing for recording a data on a film area, said lens-fitted film unit comprising:

an exposure chamber provided inside said light-tight film unit housing which has a front wall formed with a subject exposure aperture through which subject light from a subject enters said exposure chamber and a data exposure aperture separated from said subject exposure aperture through which external data light passing through a data display means of said data recording module enters said exposure chamber;

a shutter blade having a first blade section for opening and closing said subject exposure aperture and a second blade section for opening and closing said data exposure aperture; and exposure means for causing said shutter blade to open and close said subject exposure aperture and said data exposure aperture so as thereby to expose said film to said subject light and said data light, respectively;

said first and second blade sections being formed integrally with each other and said second blade section being formed outside an area screened by said first blade section when said shutter blade opens and closes said subject exposure aperture and said data exposure apertures;

said shutter blade being arranged so that said data light reaches said film by passing through an opening in said shutter blade entirely surrounded by said shutter blade.

2. A lens-fitted film unit as defined in claim 1, wherein said data recording module comprises a liquid crystal display and a clock circuit for exciting said liquid crystal display to display a calendar date as said data thereon.

3. The lens-fitted film unit of claim 1, wherein the opening in the shutter blade is elongated.

4. The lens-fitted film unit of claim 3, wherein the elongated opening in the shutter blade has an arcuate shape.

5. A lens-fitted film unit having a light-tight film unit housing, a film cartridge loaded in said light-tight film unit housing and a data recording module incorporated in said light-tight film unit housing for recording data on a film area, said lens-fitted film unit comprising:

an exposure chamber provided inside said light-tight film unit housing which has a front wall formed with a subject exposure aperture through which subject light from a subject enters said exposure chamber and a data exposure aperture separated from said subject exposure aperture through which external light passing through a data display means of said data recording module enters said exposure chamber;

a shutter blade having a first blade section for opening and closing said subject exposure aperture and a second blade section for opening and closing said data exposure aperture, each of said shutter blade and said front wall having a light block rib extending away therefrom; and exposure means for causing said shutter blade to open and close said subject exposure aperture and said data exposure aperture so as thereby to expose said film to said subject light and said data light, respectively;

said first and second blade sections being formed integrally with each other and said second blade section being formed outside an area screened by said first blade section when said shutter blade opens and closes said subject exposure aperture and said data exposure aperture.

6. The lens-fitted film unit of claim 5, wherein the light block rib on the shutter blade extends toward the front wall, and the light block rib on the front wall extends toward the shutter blade.

7. The lens-fitted film unit of claim 6, wherein the light block ribs are structured so as to prevent light from leaking around the shutter blade.

8. A lens-fitted film unit having a light-tight film unit housing, a film cartridge loaded in said light-tight film unit housing and a data recording module incorporated in said light-tight film unit housing for recording data on a film area, said lens-fitted film unit comprising:

an exposure chamber provided inside said light-tight film unit housing which has a front wall formed with a subject exposure aperture through which subject light from a subject enters said exposure chamber and a data exposure aperture separated from said subject exposure aperture through which external light passing through a data display means of said data recording module enters said exposure chamber;

a rotatable first shutter blade for opening and closing said subject exposure aperture, said first shutter blade being held in a non-exposure position by a first return spring;

a rotatable second shutter blade for opening and closing said data exposure aperture, said second shutter blade being held in a non-exposure position through contact with the first shutter blade against a second spring; and exposure means for causing said first shutter blade to open and close said subject exposure aperture;

wherein said opening of said first shutter blade allows said second spring to urge said second shutter blade to open said data exposure aperture, said first shutter blade being urged back toward the non-exposure position by said first spring, the first shutter blade making contact with the second shutter blade and pushing the second shutter blade into the non-exposure position against the second spring.

9. The lens-fitted film unit of claim 8, wherein the first shutter blade comprises a first projection extending away therefrom and the second shutter blade comprises a second projection extending away therefrom, wherein the first and second projections are disposed on the respective shutter blades so that the first projection contacts the second projection when the first shutter blade pushes the second shutter blade into the non-exposure position.

* * * * *